(12) United States Patent
Watanabe et al.

(10) Patent No.: US 6,307,166 B1
(45) Date of Patent: Oct. 23, 2001

(54) COORDINATE INPUT DEVICE HAVING HIGH TRANSMITTANCE

(75) Inventors: Takeshi Watanabe; Takashi Nishiyama, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/366,032

(22) Filed: Aug. 2, 1999

(30) Foreign Application Priority Data

Aug. 4, 1998 (JP) .................................................. 10-220895

(51) Int. Cl.$^7$ .................................................. G06K 11/16
(52) U.S. Cl. .................................... 178/18.05; 178/18.03; 345/156; 345/173; 345/179
(58) Field of Search ..................................... 345/174, 156, 345/157, 173, 179, 182, 183; 178/18.05, 18.03, 18.01, 18.06, 18.07

(56) References Cited

U.S. PATENT DOCUMENTS

| | | | |
|---|---|---|---|
| 4,628,408 | * 12/1986 | Kimura | ................................. 361/742 |
| 4,990,900 | * 2/1991 | Kikuchi | ................................. 345/174 |
| 5,555,163 | * 9/1996 | Pisani | ................................. 362/252 |

* cited by examiner

Primary Examiner—Mark Zimmerman
Assistant Examiner—Mackly Monestime
(74) Attorney, Agent, or Firm—Brinks Hofer Gilson & Lione

(57) ABSTRACT

A coordinate input device includes an upper electrode composed of a transparent resistive layer formed on the lower surface of a flexible transparent film, a lower electrode composed of a transparent resistive layer formed on the upper surface of a substrate composed of transparent glass, a thin film composed of a transparent insulating material having a plurality of holes, and spacers composed of an insulating material provided on the thin film. The upper electrode and the lower electrode are opposed to each other with the spacers therebetween so that the upper electrode and the lower electrode conduct when they are brought into contact with each other through the holes, and the thin film has a lower refractive index than that of the lower electrode.

6 Claims, 4 Drawing Sheets

COORDINATE INPUT DEVICE HAVING HIGH TRANSMITTANCE

BACKGROUND OF THE INVENTION

1. Field of the Invention

The present invention relates to a coordinate input device in which data are inputted by operating an operating area with an input device such as a pen.

2. Description of the Related Art

FIG. 4A is a sectional view of the main portion of a conventional coordinate input device, and FIG. 4B is a sectional view taken along the line 4B—4B of FIG. 4A.

As shown in FIGS. 4A and 4B, in the conventional coordinate input device, a transparent lower electrode 22 composed of an ITO film (a resistive film formed of indium oxide) is provided over the entire upper surface of a substrate 21 composed of transparent rectangular sheet glass, and a plural spacers 23 composed of a transparent insulating material are provided on the upper surface of the lower electrode 22, spaced at intervals.

A transparent upper electrode 25 composed of an ITO film is provided over the entire lower surface of a film 24 composed of a transparent plastic such as polyethylene terephthalate. The upper electrode 25 is opposed to the lower electrode 22 and is placed on the spacers 23. Thus, the lower electrode 22 and the upper electrode 25 are combined, being isolated from each other.

When such a coordinate input device is used, it is, for example, placed on a liquid crystal display device or the like. The information displayed on the liquid crystal display device is visually perceived by the operator through the coordinate input device. In response to this, an input device (not shown in the drawing), such as an input pen, is pressed against the film 24 to cause deformation, and the upper electrode 25 is brought into contact with or separated from the lower electrode 22, and thus a desired coordinate is inputted.

However, although the conventional coordinate input device is composed of transparent materials, since materials having different refractive indices are deposited, the light passing through the coordinate input device may be attenuated or reflected, and thus the transmittance therethrough cannot be 100%. When the coordinate input device is combined with a liquid crystal display device or the like, the displayed content may be attenuated, resulting in reduced visibility in comparison to the liquid crystal display device alone. Therefore, a method for increasing transmittance through a coordinate input device is desired.

SUMMARY OF THE INVENTION

It is an object of the present invention to provide a coordinate input device having high transmittance therethrough.

In accordance with the present invention, a coordinate input device includes an upper electrode composed of a transparent resistive layer formed on the lower surface of a flexible transparent film, a lower electrode composed of a transparent resistive layer formed on the upper surface of a substrate composed of transparent glass, a thin film composed of a transparent insulating material having a lower refractive index than that of the lower electrode, the thin film being provided with a plurality of holes, and spacers composed of an insulating material provided on the thin film. The upper electrode and the lower electrode are opposed to each other with the spacers therebetween so that the upper electrode and the lower electrode both conduct when they are brought into contact with each other through the holes. Thus, the reflectance of transmitted light is decreased and the transmittance is increased while maintaining the input performance in the coordinate input device.

In a coordinate input device of the present invention, the holes are preferably formed at a distance in a grid pattern. Thus, uniform input load is obtained over the entire coordinate input device when coordinates are inputted, and the transmittance is improved.

In a coordinate input device of the present invention, preferably, the lower electrode is composed of indium oxide, and the thin film is composed of a material selected from the group consisting of an acrylic resin, an epoxy resin, a silicone resin, a fluororesin, magnesium fluoride, and silicon dioxide.

In a coordinate input device of the present invention, preferably, the thin film has a thickness of 50 nm to 1,000 nm, the holes have a diameter of 30 $\mu$m to 200 $\mu$m, and the holes are spaced at a distance of 30 $\mu$m to 200 $\mu$m.

DESCRIPTION OF THE PREFERRED EMBODIMENTS

Figure 1A:
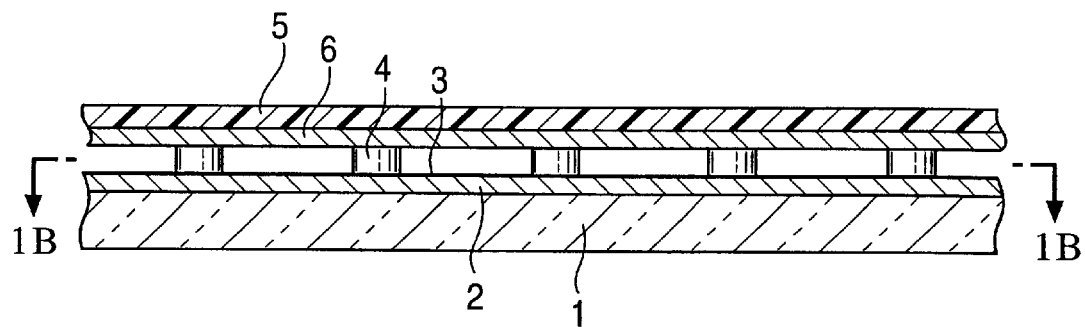
FIGS. 1A and 1B are schematic diagrams of a coordinate input device of the present invention.
Figure 1B:
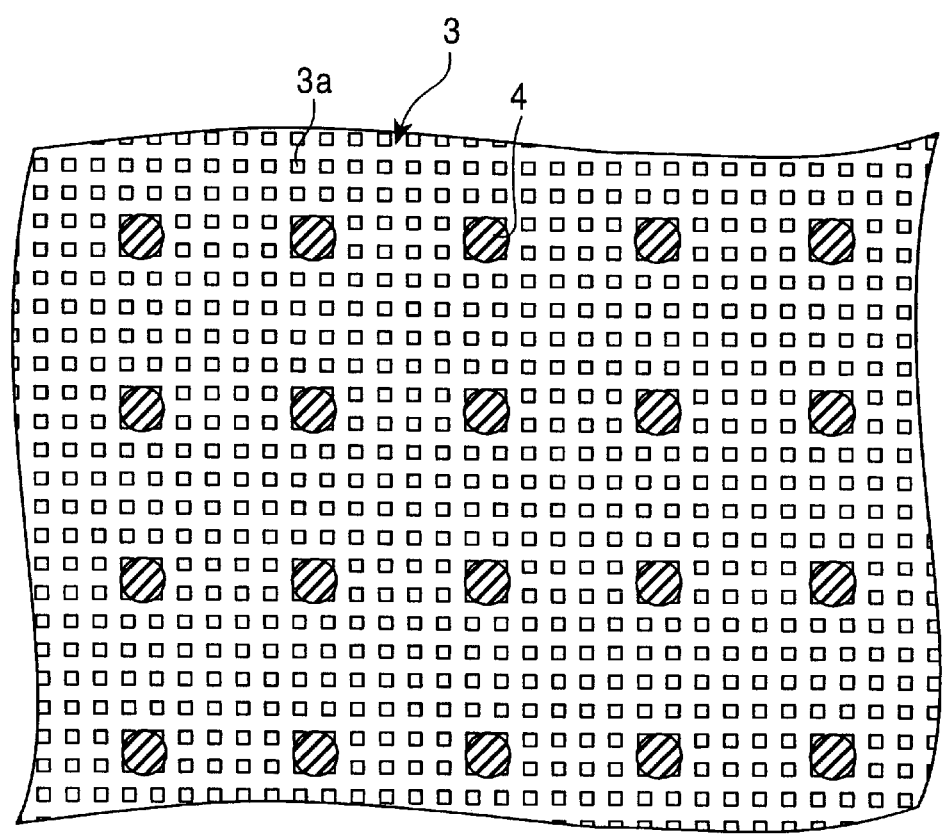
Figure 2A:
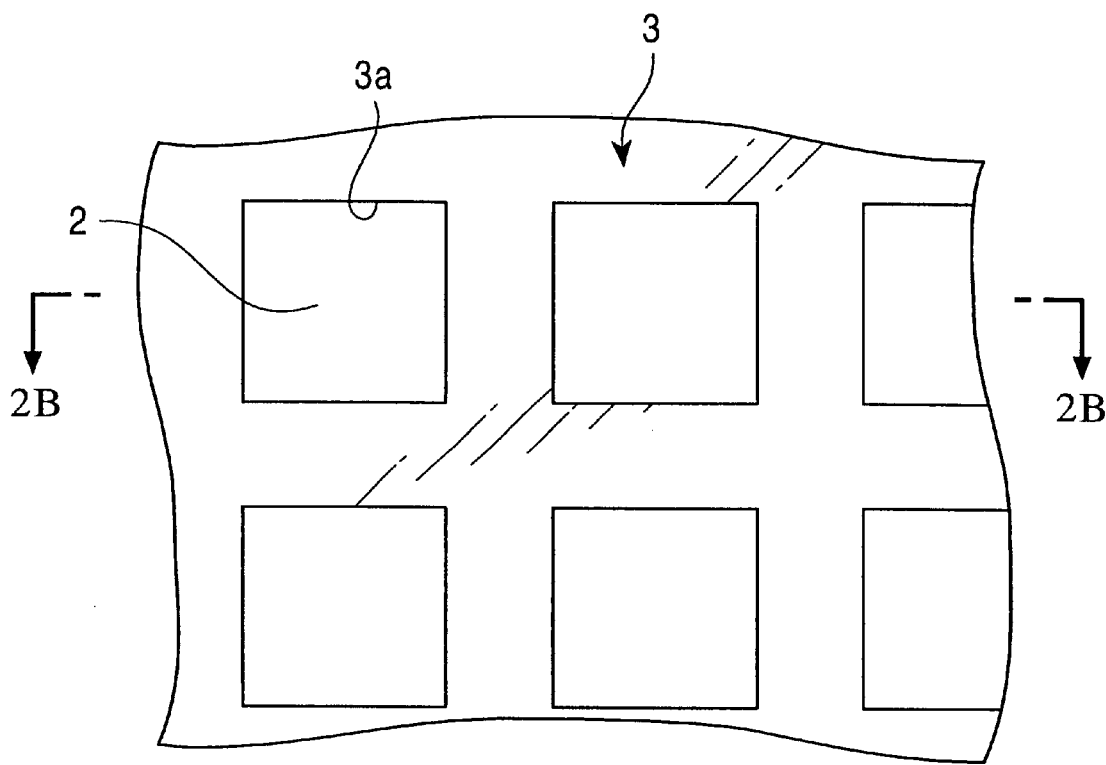
FIGS. 2A and 2B are schematic diagrams which show a major portion of the present invention.
Figure 2B:
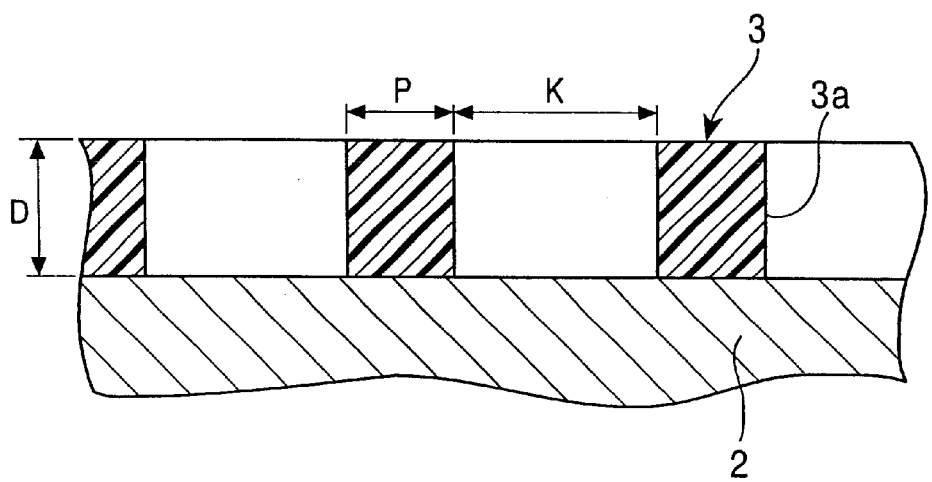
Figure 3:
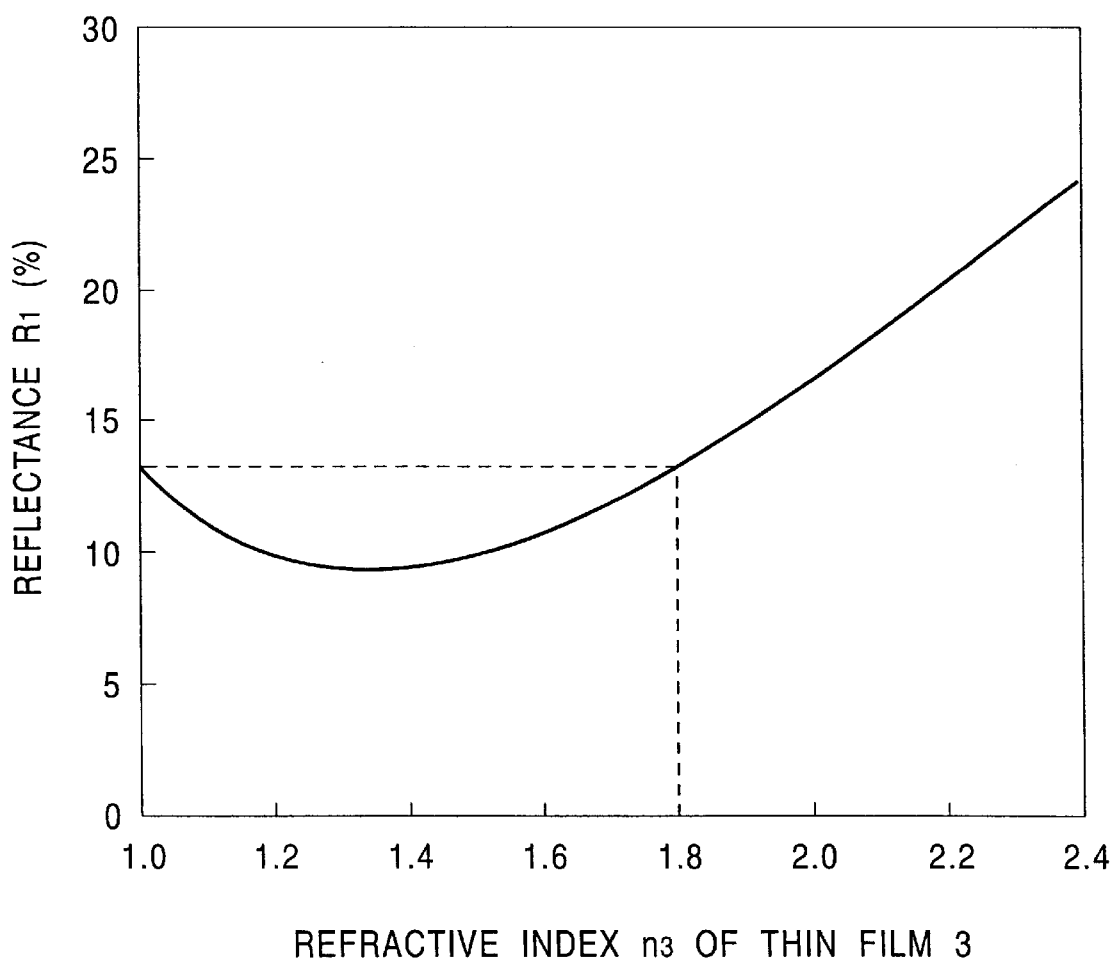
FIG. 3 is a graph showing the characteristics of a coordinate input device of the present invention.
Figure 4A:
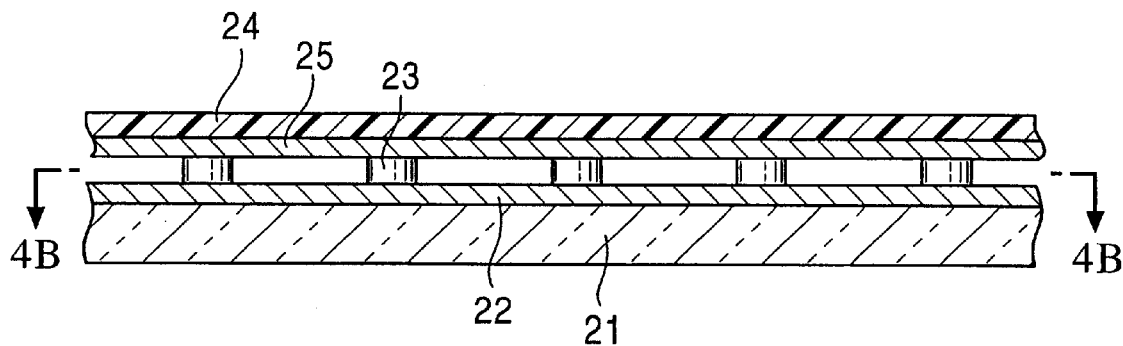
FIGS. 4A and 4B are schematic diagrams of a conventional coordinate input device.
Figure 4B:
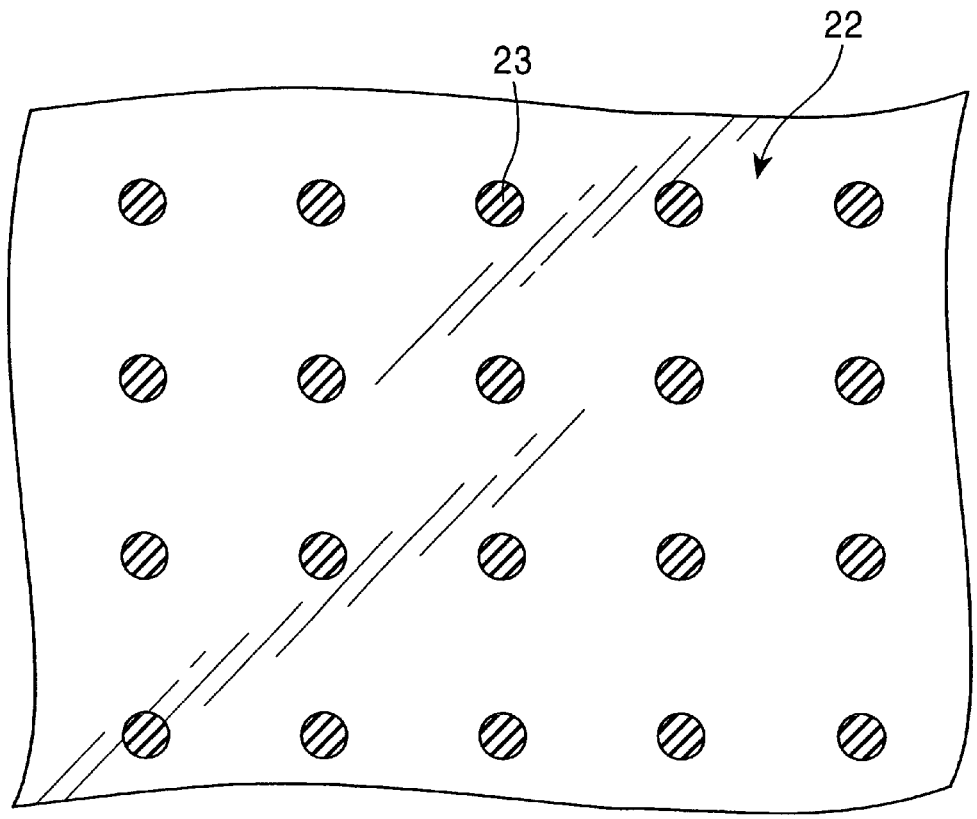

The embodiments of coordinate input devices of the present invention will be described. FIG. 1A is a sectional view of a coordinate input device of the present invention, and FIG. 1B is a sectional view taken along the line 1B—1B of FIG. 1A. FIG. 2A is a sectional view of a major portion of a coordinate input device of the present invention, and FIG. 2B is a sectional view taken along the line 2B—2B of FIG. 2A. FIG. 3 is a graph which shows a relationship between the refractive index of a thin film and the reflectance.

As shown in FIGS. 1A and 1B, in a coordinate input device of the present invention, a transparent lower electrode 2 composed of an ITO film (a resistive film formed of indium oxide) is provided over the entire upper surface of a substrate 1 composed of transparent rectangular sheet glass.

A thin film 3 composed of a resin such as an acrylic resin, an epoxy resin, a silicone resin, or a fluororesin, or a transparent material such as magnesium fluoride or silicon dioxide is placed on the upper surface of the lower electrode 2, and as shown in FIGS. 2A and 2B, the thin film 3 is provided with a plurality of square holes 3a spaced at a distance and formed in a grid pattern. A material constituting the thin film 3 has a lower refractive index than that of a material constituting the lower electrode 2, and specifically has a lower refractive index than that of the ITO film constituting the lower electrode 2. Additionally, since the material used for the thin film 3 is either a solid or a liquid, the refractive index thereof is higher than 1.0, which is the refractive index of air. The thin film 3 provided with the holes 3a is formed by screen printing, intaglio printing, relief printing, photolithography, or the like.

A plurality of spacers 4 composed of a transparent insulating material are disposed and spaced at a distance on the upper surface of the lower electrode 2. The spacers 4 are formed on the lower electrode 2 and the thin film 3 by printing. The individual spacers have an outer diameter of 50 to 100 μm, a height of 2.5 to 10 μm, and are arranged at a predetermined distance in the range of 0.5 to 5 mm.

An upper electrode 6 composed of an ITO film is provided on the entire lower surface of a film 5 composed of a transparent plastic such as polyethylene terephthalate, and the upper electrode 6 is opposed to the lower electrode 2 and placed on the spacers 4. Thus, the lower electrode 2 and the upper electrode 6 are combined, being isolated from each other.

When such a coordinate input device is used, it is placed on a liquid crystal display device or the like. The contents displayed on the liquid crystal display device are visually perceived by the operator through the coordinate input device. In response to this, an input device (not shown in the drawing), such as an input pen, is pressed against the film 5 to cause deformation, and the upper electrode 6 is brought into contact with or separated from the lower electrode 2 through the holes 3a of the thin film 3, and thus a desired coordinate is inputted.

In the coordinate input device of the present invention, by providing the thin film 3, light transmittance therethrough can be increased in comparison with conventional coordinate input devices. This will be described with reference to the following example. In the following description, transmittance between the substrate 1 and the thin film 3 in the coordinate input device of the present invention is compared with transmittance between the substrate 21 and the lower electrode 22 in the conventional coordinate input device.

Generally, with respect to two adjacent transparent objects A and B having different refractive indices ($n_A$ and $n_B$), when light is transmitted from the object A having the refractive index of $n_A$ to the object B having the refractive index $n_B$, a reflectance R is expressed by the following formula (1), if a wavelength λ of light is within a range of from 400 to 700 nm.

$$(\text{Reflectance } R) = \{(n_A - n_B)/(n_A + n_B)\}^2 \quad (1)$$

A transmittance T is expressed by the following formula (2):

$$(\text{Transmittance } T) \approx 1 - (\text{Reflectance } R) \quad (2)$$

$$\approx 1 - \{(n_A - n_B)/(n_A + n_B)\}^2$$

(The approximation shown in (2) is derived because absorption of light by glass, polyethylene terephthalate, etc., is negligible compared to the reflectance and can be disregarded.)

When a plurality of objects are deposited, a transmittance T is derived from the sum total of all the reflectances R. Provided that glass constituting the substrate 1 has a refractive index $n_1$ of 1.52, an ITO film constituting the lower electrode 2 has a refractive index $n_2$ of 1.8, a material constituting the thin film 3 has a refractive index $n_3$ of 1.6, and air below the substrate 1 and above the lower electrode 2 and the thin film 3 has a refractive index $n_{air}$ of 1, when light enters from the lower side of the substrate 1 of the coordinate input device of the present invention, a reflectance $R_1$ of the light passing through the thin film 3 is expressed as follows in accordance with the formula (1).

$$R_1 = \{(n_{air} - n_1)/(n_{air} + n_1)\}^2 + \quad (3)$$
$$\{(n_1 - n_2)/(n_1 + n_2)\}^2 +$$
$$\{(n_2 - n_3)/(n_2 + n_3)\}^2 +$$
$$\{(n_3 - n_{air})/(n_3 + n_{air})\}^2$$

Therefore, a transmittance $T_1$ is derived from the formulas (2) and (3) as follows.

$$T_1 = 1 - R_1$$
$$= 1 - [\{(1 - 1.52)/(1 + 1.52)\}^2 +$$
$$\{(1.52 - 1.8)/(1.52 + 1.8)\}^2 +$$
$$\{(1.8 - 1.6)/(1.8 + 1.6)\}^2 +$$
$$\{(1.6 - 1)/(1.6 + 1)\}^2]$$
$$\approx 0.894$$

Thus, the transmittance is approximately 89.4%.

On the other hand, in the conventional coordinate input device, provided that glass constituting the substrate 21 has a refractive index $n_{21}$ of 1.52, an ITO film constituting the lower electrode 22 has a refractive index $n_{22}$ of 1.8, and air below the substrate 21 and above the lower electrode 22 has a refractive index $n_{air}$ of 1, when light enters from the lower side of the substrate 21 of the conventional coordinate input device, a reflectance $R_2$ of the light passing through the lower electrode 22 is expressed as follows in accordance with the formula (1).

$$R_2 = \{(n_{air} - n_{21})/(n_{air} + n_{21})\}^2 + \quad (4)$$
$$\{(n_{21} - n_{22})/(n_{21} + n_{22})\}^2 +$$
$$\{(n_{22} - n_{air})/(n_{22} + n_{air})\}^2$$

Therefore, a transmittance $T_2$ is derived from the formulas (2) and (4) as follows.

$$T_1 = 1 - R_2$$
$$= 1 - [\{(1 - 1.52)/(1 + 1.52)\}^2 +$$
$$\{(1.8 - 1)/(1.8 + 1)\}^2]$$
$$\approx 0.870$$

Thus, the transmittance is approximately 87.0%.

As is clear from the above, the transmittance $T_1$ of light from the substrate 1 to the thin film 3 in the coordinate input device of the present invention is increased by approximately 2.4% in comparison with the transmittance $T_2$ of light from the substrate 21 to the lower electrode 22 in the conventional coordinate input device without the thin film 3.

By constituting the thin film 3 with a material having a refractive index lower than 1.8, which is a refractive index of the ITO film constituting the lower electrode 2, the reflectance is decreased and the transmittance is increased. Support for this can be found by varying a value substituted for the refractive index $n_3$ of the material constituting the thin film 3 at 1 or more. That is, when the refractive index $n_1$ of the substrate 1, the refractive index $n_2$ of the lower electrode 2, and the refractive index $n_{air}$ of air are set as $n_1=1.52$, $n_2=1.8$, and $n_{air}=1$, respectively, and the refractive index $n_3$ of a material constituting the thin film 3 is varied, the reflectance $R_1$ derived from the formula (3) is lower than the reflectance in the conventional coordinate input device (the value at $n_3=1$ and $n_3=1.8$) in a range where the refractive index is lower than that of the lower electrode 2, that is, in the range from $n_3=1$ to $n_3=1.8$, and the reflectance $R_1$ derived from the formula (3) is higher than the reflectance in the conventional coordinate input device (the value at $n_3=1$ and $n_3=1.8$) in a range where the refractive index is higher than that of the lower electrode 2, that is, in the range of $n_3>1.8$.

A resin such as an acrylic resin, an epoxy resin, a silicone resin, or a fluororesin, or a transparent material such as magnesium fluoride or silicon dioxide which constitutes the thin film 3 has a lower refractive index than 1.8, that is a refractive index of the ITO film constituting the lower electrode 2, and has a higher refractive index than 1.0, which is the refractive index of air. By forming the thin film 3 having a refractive index in such a range, the transmittance of the coordinate input device is increased. The more preferable range of the refractive index of the thin film 3, in which the degree of increase in transmittance is increased, corresponds to the bottom of the curve shown in FIG. 3 derived from the formula (3), that is, approximately from 1.2 to 1.5. By forming the thin film 3 using a material having such a refractive index, the transmittance can be effectively increased. Since the materials described above have different refractive indices and different formation methods, a suitable material may be selected appropriately.

The comparison of transmittance described above is made with respect to the light passing from the lower side to the upper side, which is an example when the coordinate input device is used for a transmission-type liquid crystal display device. When the coordinate input device of the present invention is used for a reflection-type liquid crystal display device, light from above the coordinate input device is transmitted toward the lower side in which the reflection-type liquid crystal display device is provided, and the transmitted light is reflected by a reflector of the reflection-type liquid crystal display device, and is further transmitted from the lower side to the upper side. Thus, since the light passes through the thin film 3 twice, the transmittance is further improved in comparison with the case when the conventional coordinate input device is used. Therefore, the visibility of displayed content in the liquid crystal display device or the like is further improved.

Although the transmittance is improved by providing the thin film 3, since a material constituting the thin film 3 is an insulating material, if the thin film 3 is formed on the entire upper surface of the lower electrode 2, the upper electrode 6 and the lower electrode 2 cannot be brought into contact with each other, and thus coordinate input cannot be performed. In order to obtain the uniform increase effect of transmittance over the entire surface of the coordinate input device while maintaining the state in which the upper electrode 6 and the lower electrode 2 are brought into contact with or separated from each other, holes 3a are formed, being spaced at a distance, in a grid pattern. By providing the holes 3a at an equal distance, uniform input load is obtained over the entire coordinate input device when coordinate input is performed.

If a distance P between the individual holes 3a is less than 30 μm, an area in which the thin film 3a remains is decreased, and it becomes difficult to increase the transmittance uniformly over the entire coordinate input device.

Thus, the distance P is preferably set at 30 μm or more. If the distance P exceeds 200 μm, the accessibility between the upper electrode 6 and the lower electrode 2 is decreased when coordinate input is performed. Thus, the distance P is preferably set at 200 μm or less.

If the size of the hole 3a, that is, a diameter K of the hole 3a is less than 30 μm. the input load for bringing the upper electrode 6 into contact with the lower electrode 2 is increased, and coordinate input is not performed easily. Thus, the diameter K is preferably set at 30 μm or more. If the diameter K exceeds 200 μm the holes 3a may be easily perceived visually. and may be mistakenly recognized as contaminants or dirt. Thus, the diameter K is preferably set at 200 μm or less.

If a thickness D of the thin film 3 is less than 50 nm, it becomes difficult to form the thin film 3 by printing. Thus, the thickness D is preferably set at 50 nm or more. If the thickness D of the thin film 3 exceeds 1,000 nm, the input load for bringing the upper electrode 6 into contact with the lower electrode 2 through the holes 3a is increased. Thus, the thickness D is preferably set at 1,000 nm or less. More preferably, an optimum thickness is determined depending on the refractive index of a material used. The following (5) is a formula for finding the optimum thickness of the thin film 3.

$$D=\lambda/4/n \quad (5)$$

where D is a thickness (nm), n is a refractive index, and $\lambda$ is a wavelength (nm) of light.

For example, when a material having a refractive index n of 1.6 is used and a wavelength $\lambda$ is 500 to 550 nm, the optimum thickness $D_{500}$ of the thin film 3 when $\lambda=500$ nm and the optimum thickness $D_{550}$ when $\lambda=550$ nm are as follows:

$$D_{500}=500/4/1.6=78 \text{ (nm)}$$

$$D_{550}=550/4/1.6=86 \text{ (nm)}$$

Thus, the optimum thickness of the thin film 3 is 78 nm to 86 nm.

In the embodiment of the coordinate input device of the present invention, although the hole 3a is square, the shape is not limited to this, and the hole may be a polygon, such as a regular hexagon, or may be round. Although the lower electrode 2 is composed of an ITO film, even when other transparent electrodes (for example. tin dioxide $SnO_2$) are used, by forming the thin film 3 on the transparent electrode by using a material having a lower refractive index than that of the material constituting the transparent electrode, the transmittance can also be increased.

In accordance with the present invention, a coordinate input device includes an upper electrode composed of a transparent resistive layer formed on the lower surface of a flexible transparent film, a lower electrode composed of a transparent resistive layer formed on the upper surface of a substrate composed of transparent glass, a thin film composed of an insulating material having a lower refractive index than that of the lower electrode, the thin film being provided with a plurality of holes, and spacers composed of an insulating material provided on the thin film. The upper electrode and the lower electrode are opposed to each other with the spacers therebetween, and the upper electrode and the lower electrode are brought into contact with or separated from each other through the holes, enabling conduction. Thus, the transmittance of light from the lower side of the coordinate input device can be increased, and the visibility of displayed content of a liquid crystal display device or the like disposed below the coordinate input device can be improved.

In a coordinate input device of the present invention, since the holes are spaced at a distance and formed in a grid pattern, the transmittance can be improved over the entire surface of the coordinate input device while uniform input load is obtained, thus maintaining the input performance.

In a coordinate input device of the present invention, the lower electrode is composed of indium oxide (ITO), and the thin film is composed of a material selected from the group consisting of an acrylic resin, an epoxy resin, a silicone resin, a fluororesin, magnesium fluoride, and silicon dioxide. Thus, since the thin film has a lower refractive index than that of the ITO film constituting the lower electrode, the reflectance of light is decreased and the transmittance is improved.

In a coordinate input device of the present invention, the thin film has a thickness of 50 nm to 1,000 nm, the holes have a diameter of 30 $\mu$m to 200 $\mu$m, and the holes are spaced at a distance of 30 $\mu$m to 200 $\mu$m. Thus, the input operation in the coordinate input device can be performed appropriately, and the transmittance is effectively improved.

What is claimed is:

1. A coordinate input device comprising:

an upper electrode comprising a transparent resistive layer formed on the lower surface of a flexible transparent film;

a lower electrode comprising a transparent resistive layer formed on the upper surface of a substrate comprising transparent glass;

a thin film comprising a transparent insulating material having a plurality of holes, said plurality of holes being spaced so as to form a grid pattern; and a plurality of spacers comprising an insulating material provided on the thin film;

wherein the upper electrode and the lower electrode are opposed to each other with the spacers therebetween so that the upper electrode and the lower electrode conduct when the upper electrode and the lower electrode are brought into contact with each other through the holes, wherein each of said holes has an opening of at least 30 $\mu$m and not more than 200 $\mu$m, and a spacing between adjacent holes of at least 30 $\mu$m and not more than 200 $\mu$m, and wherein the thin film has a lower refractive index than that of the lower electrode, the thin film having a refractive index of between 1.0 and 1.8.

2. A coordinate input device according to claim 1, wherein the lower electrode comprises indium oxide, and the thin film comprises a material selected from the group consisting of an acrylic rein, an epoxy resin, a silicone resin, a fluororesin, magnesium fluoride, and silicon dioxide.

3. A coordinate input device according to claim 1, wherein the thin film has a thickness of 50 nm through 1,000 nm.

4. A coordinate input device according to claim 1, wherein the thin film has a refractive index of at least 1.2 and not more than 1.5.

5. A coordinate input device according to claim 1, wherein said holes each comprise a square shape.

6. A coordinate input device according to claim 1, wherein the plurality of spacers each comprise a column shaped, said column having a diameter of at least 50 $\mu$m and not more than 100 $\mu$m, a height of at least 2.5 $\mu$m and not more than 10 $\mu$m, and a clearance gap between adjoining spacers of at least 0.5 $\mu$m and not more than 5 $\mu$m.

* * * * *